March 24, 1959     A. R. WHEELER     2,879,020
EQUIPMENT HOSE AND FLEXIBLE TUBE SUPPORT
Filed July 8, 1955     2 Sheets-Sheet 1
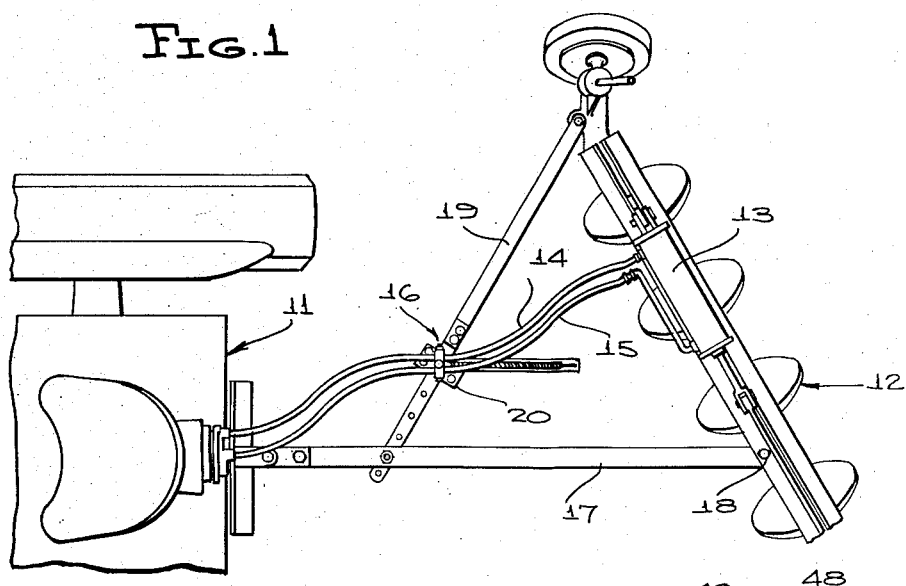
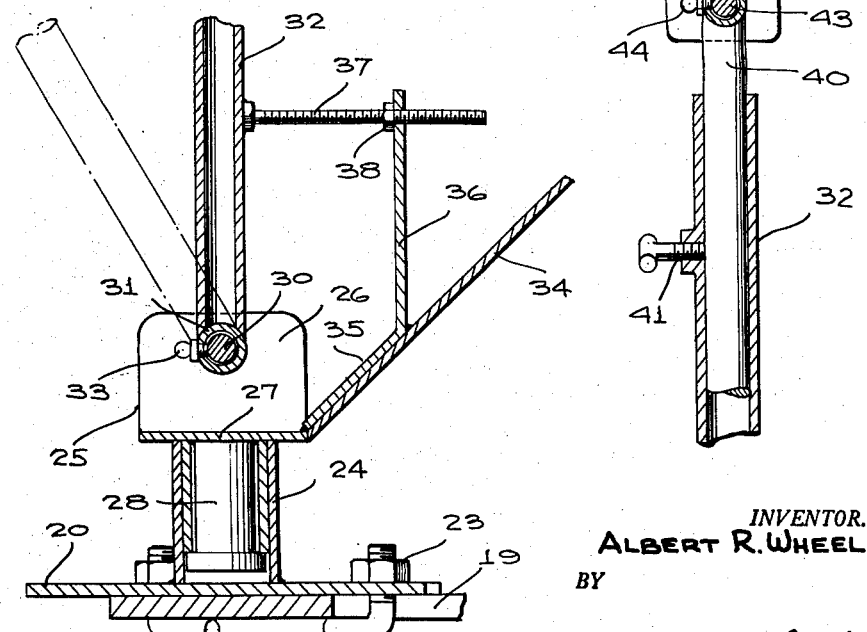
INVENTOR.
ALBERT R. WHEELER
BY
McMorrow, Berman & Davidson
ATTORNEYS

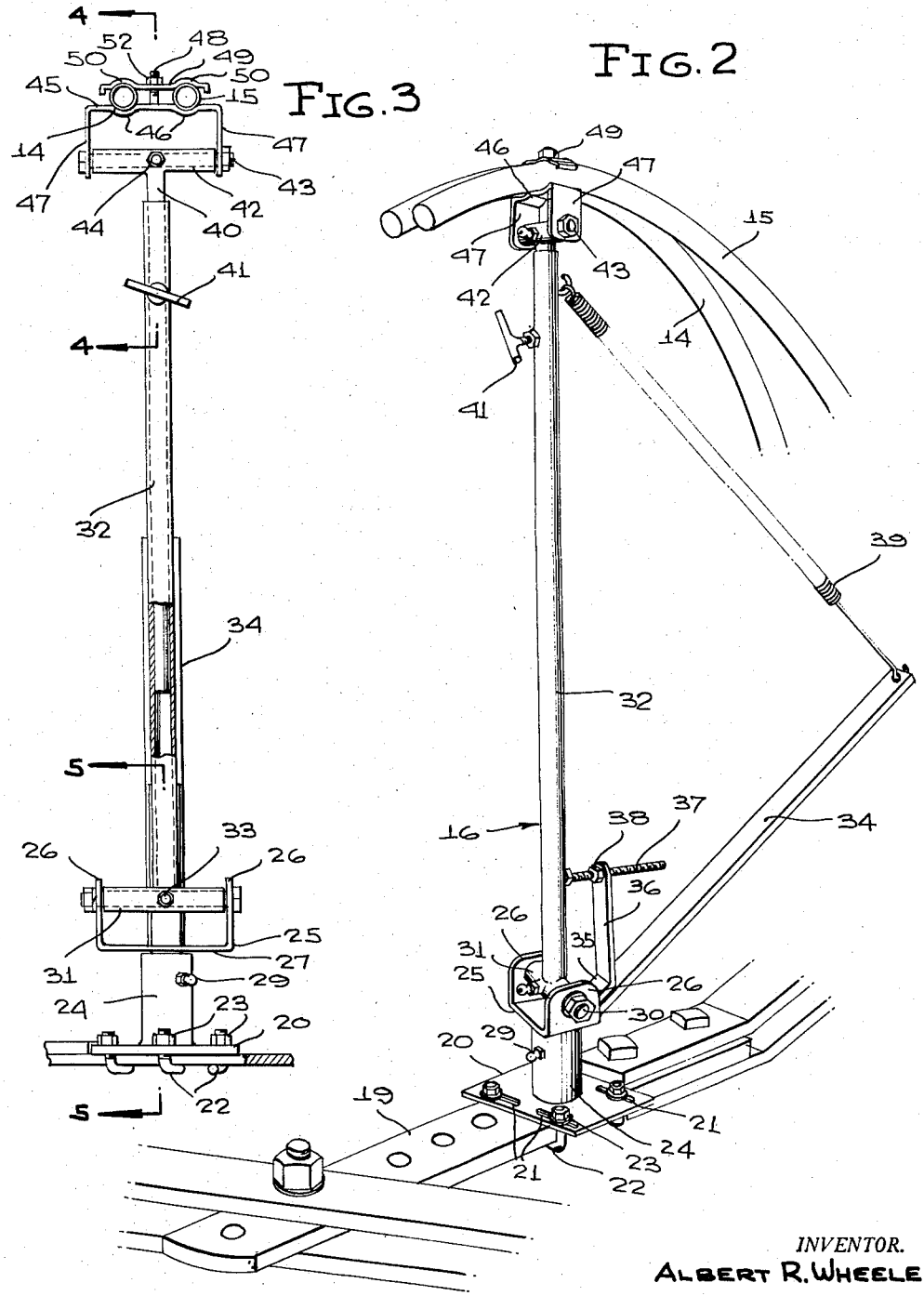

United States Patent Office 2,879,020
Patented Mar. 24, 1959

2,879,020

EQUIPMENT HOSE AND FLEXIBLE TUBE SUPPORT

Albert R. Wheeler, Scott City, Kans.

Application July 8, 1955, Serial No. 520,872

3 Claims. (Cl. 248—75)

This invention relates to supports, and more particularly to an improved support for flexible hose extending between a first member and another member, wherein the distance between the two members varies.

A main object of the invention is to provide a novel and improved hose support to support flexible hose between a first member and a second member, wherein the distance between the members varies, the improved support being simple in construction, being readily adjustable in accordance with the length of the flexible hose to be supported and the desired height at which such hose is to be supported, and being yieldable to allow the hose to move forwardly or rearwardly for limited distances as the distance between the two members varies during the operation of the system.

A further object of the invention is to provide an improved adjustable supporting attachment for use between a tractor vehicle and a trailer vehicle, for example, between a tractor and a hydraulically operated piece of equipment, the improved device being inexpensive to manufacture, being sturdy in construction, being adjustable to the most desirable height and position for efficiently supporting the flexible hose and for allowing the supported portion of the hose to move during working conditions, and preventing damage to the hose by eliminating any tendency of the hose to sag or drag on the ground at any time.

Further objects and advantages of the invention will become apparent from the following description and claims, and from the accompanying drawings, wherein:

Figure 1 is a fragmentary top plan view of the rear portion of a tractor and a cultivating implement attached thereto, showing the manner in which an improved hose supporting attachment is employed to support the hose between the tractor and the cultivating implement.

Figure 2 is an enlarged perspective view of the hose supporting attachment employed in Figure 1.

Figure 3 is a front elevational view, partly in vertical cross section, of the hose supporting attachment of Figures 1 and 2.

Figure 4 is an enlarged cross sectional view taken on the line 4—4 of Figure 3.

Figure 5 is an enlarged cross sectional view taken on the line 5—5 of Figure 3.

Referring to the drawings, 11 generally designates a conventional tractor and 12 generally designates a piece of hydraulically operated equipment, such as a cultivating implement having a hydraulic operating cylinder 13. The hydraulic cylinder of the cultivating implement 12 is connected by a pair of flexible conduits 14 and 15 to the hydraulic pump of the tractor 11 in the usual manner, a sufficient amount of slack being allowed in the conduits 14 and 15 to allow the cultivating attachment 12 to angle during the various working movements of the tractor 11.

In accordance with the present invention, a hose supporting device, designated generally at 16, is employed to support the flexible conduits 14 and 15.

As is clearly shown in Figure 1, the implement 12 is connected to the rear portion of the tractor 11 by a first drawbar 17 extending to one side of the implement and connected thereto by a bolt 18. The other side of the implement is connected to a portion of the drawbar 17 adjacent the tractor 11 by a brace bar 19.

Designated at 20 is a generally rectangular bracket plate which is disposed on the brace bar 19 and which is formed with transversely extending corner slots 21 which are of sufficient length to overlie the respective side edges of the brace bar 19, as is clearly shown in Figure 2.

Designated at 22 are respective hook-shaped bolts which extend through the slots 21 and which are provided at their top portions with nuts 23, the bolts 22 being arranged to extend beneath the brace bar 19 and to secure the bracket plate 20 rigidly thereto responsive to the tightening of the nuts 23.

Rigidly secured to the central portion of the bracket plate 20 is the vertical upstanding sleeve 24. Designated at 25 is a support which is connected to the sleeve 24 for rotary movement about the sleeve as an axis. Specifically, the support embodies a generally U-shaped yoke member having the upstanding vertical side flanges 26, 26 and the horizontal bight portion 27. Rigidly connected to bight portion 27 is the vertical, depending stem 28 which is journaled in the vertical sleeve 24, as is clearly shown in Figure 5, a suitable grease fitting 29 being provided to lubricate the rotatable connection between the stem 28 and the sleeve 24.

Designated at 30 is a horizontal pivot bolt which is secured in the upstanding flanges 26, 26. Journaled on the bolt 30 between the flanges 26, 26 is a sleeve member 31 to which is rigidly secured the upstanding tubular post member 32. A suitable grease fitting 33 is provided centrally on the sleeve member 31 to lubricate the rotatable connection between sleeve 31 and pivot bolt 30. As shown, the post member 32 extends upwardly and is rotatable around the horizontal pivot bolt 30 in a vertical plane perpendicular to said pivot bolt.

Rigidly secured, as by welding or the like, to the bight portion 27 of the yoke member 25 is the upwardly and rearwardly inclined arm 34, and secured to said arm is an angled bracket 35 having the vertical upstanding end portion 36.

Threadedly engaged through the top portion of the upstanding member 36 is a horizontal stop bolt 37 which is located in the plane of rotation of the post member 32, as is clearly shown in Figures 2 and 5, the stop bolt 37 being provided with a lock nut 38 which, when tightened, locks the stop bolt 37 in an adjusted position to limit clockwise rotation of the post member 32, as viewed in Figures 2 and 5.

The upper portion of the post member 32 is connected to the free end of the arm 34 by a coiled spring 39, biasing the post member 32 against the stop member 37.

Designated at 40 is a rod member which is telescopically received in the top portion of the post member 32 and which may be secured in adjusted position in the sleeve 32 by means of a set screw 41 provided in the top portion of said sleeve 32, as shown in Figure 4.

The rod member 40 is formed with a horizontal bearing sleeve 42 in which is journaled a horizontal pivot bolt 43, a suitable grease fitting 44 being provided centrally on the sleeve 42 to lubricate the joint between the sleeve 42 and the pivot bolt 43.

Designated at 45 is a saddle member having portions 46, 46 which are preferably, but not necessarily, arcuate to receive the respective flexible conduits 14 and 15, and having depending side arms 47, 47 secured to the respective ends of the pivot bolt 43, whereby the saddle member 45 is free to rotate around the horizontal axis defined by the pivot bolt 43. Provided on the intermediate portion of the saddle member is the upstanding stud 48 which extends through the intermediate portion of a generally U-shaped clamping bar 49 formed with portions 50, 50 which are preferably, but not necessarily, arcuate, opposing the arcuate upwardly concave portions 46, 46, and being thus clampingly engageable on the flexible conduits 14 and 15 seated in the portions 46, 46. A suitable clamping nut 52 is provided on the upper portion of the stud 48 above the clamping member 49.

Bolt 48 may be either rigidly secured on the intermediate portion of saddle member 45 or may merely fit snugly therethrough with sufficient play between the bolt and the saddle member to allow for variations in diameter between the conduits 14 and 15, or to allow for the removal of the bolt and replacement thereof by a longer bolt if required.

As is clearly shown in Figure 2, the supporting device 16 is secured at a desired position, for example, on the brace member 19, and the conduits 14 and 15 are clampingly secured between the saddle member 45 and the clamping member 49 to support the intermediate portions of the conduit members 14 and 15 in elevated positions while at the same time allowing the conduit members to flex freely in response to the various movements of the tractor 11 relative to the implement 12. Thus, when tension is developed on the conduits, the spring 39 yields to allow the post member 32 to rotate counterclockwise, as viewed in Figure 2, and when said tension is released, the spring 39 pulls the post member 32 against the stop bolt 37 to elevate the intermediate portions of the conduits and to take up any slack therein.

Bracket plate 20 may be secured to any convenient portion of the structure between the connected members, for example, on either element 17 or element 19, or on any other convenient element where the support device can function.

While hook bolts 22 have been illustrated in the specific embodiment shown in the drawings, obviously, any other suitable type of fastener may be employed, such as U-bolts, offset bolts, stud bolts, or the like, to connect the bracket plate 22 to the brace bar 19, or said bracket plate 22 could be rigidly affixed to the brace bar 19 by welding, brazing, or the like.

While the hose support device has been described above as for use between a tractor and a trailer vehicle, the support device is applicable to any situation where at least a given length of flexible conduit must be used but wherein, in normal use or operation the distance between the end connections of the conduit varies. The purpose of the support device is to allow the flexible conduit to yield to stretch and to take up slack therein when the stretch or tension is reduced. The device is thus applicable to a wide variety of situations wherein movable members are connected by a flexible conduit, such as, in cranes and hoists, lifts, brakes on semi-trailer trucks, heavy construction machines, road machinery, dirt movers, elevators, and the like. The support device is also adaptable to handle wire, wiring, cable, rope, and the like. The flexible material supported by the device may be allowed to move in any direction, such as up, down, sideways, forwardly or rearwardly, or the like, to allow any desired relative movement of the connected members.

While a specific embodiment of an improved hose support for use between a tractor vehicle and a trailer vehicle has been disclosed in the foregoing description, it will be understood that various modifications within the spirit of the invention may occur to those skilled in the art. Therefore, it is intended that no limitation be placed on the invention except as defined by the scope of the appended claims.

What is claimed is:

1. A device for supporting an intermediate portion of a hose having connected ends comprising a bracket plate adapted to be positioned upon a supporting surface, means on said plate for detachably securing said plate to said supporting surface, an upstanding sleeve carried by said bracket plate, a support positioned adjacent the upper end of said sleeve and connected to said sleeve for rotary movement about said sleeve as an axis, an upstanding post member having the lower end connected to said support for movement about a horizontal axis, a saddle positioned adjacent the upper end of said post member and connected to said post member for free rotational movement about a horizontal axis, means on said saddle shaped to receive an intermediate portion of a hose, a clamp member overlying said saddle, and means connecting said clamp member to said saddle to secure said clamp member in clamping contact with an intermediate portion of a hose supported on said saddle.

2. A device for supporting an intermediate portion of a hose having connected ends comprising a bracket plate adapted to be positioned upon a supporting surface, means on said plate for detachably securing said plate to said supporting surface, an upstanding sleeve carried by said bracket plate, a U-shaped yoke member positioned so that the horizontal bight portion is adjacent the upper end of said sleeve with the side flanges facing vertically upwardly, a vertical stem depending from said horizontal bight portion and journaled in said sleeve to connect said yoke member for rotary movement about said sleeve as an axis, an upstanding post member having the lower end connected to the side flanges of said yoke member for movement about a horizontal axis, a saddle positioned adjacent the upper end of said post member and connected to said post member for free rotational movement about a horizontal axis, means on said saddle shaped to receive an intermediate portion of a hose, a clamp member overlying said saddle, and means connecting said clamp member to said saddle to secure said clamp member in clamping contact with an intermediate portion of a hose supported on said saddle.

3. A device for supporting an intermediate portion of a hose having connected ends comprising a bracket plate adapted to be positioned upon a supporting surface, means on said plate for detachably securing said plate to said supporting surface, an upstanding sleeve carried by said bracket plate, a U-shaped yoke member positioned so that the horizontal bight portion is adjacent the upper end of said sleeve with the side flanges facing vertically upwardly, a vertical stem depending from said horizontal bight portion and journaled in said sleeve to connect said yoke member for rotary movement about said sleeve as an axis, an upstanding post member having the lower end connected to the side flanges of said yoke member for movement about a horizontal axis, a saddle positioned adjacent the upper end of said post member and connected to said post member for free rotational movement about a horizontal axis, means on said saddle shaped to receive an intermediate portion of a hose, a clamp member overlying said saddle, means connecting said clamp member to said saddle to secure said clamp member in clamping contact with an intermediate portion of a hose supported on said saddle, an arm positioned on one side of and sloping upwardly and outwardly of said post member and having the lower end fixedly secured to the bight portion of said yoke member, a stop element between said post member and said arm and secured to said arm, and spring means connecting the upper end of said arm to the upper portion of said post member and biasing said post member toward engagement with said stop member.

References Cited in the file of this patent

UNITED STATES PATENTS

| | | |
|---|---|---|
| 575,721 | Lind | Jan. 26, 1897 |
| 968,354 | Hitchcock | Aug. 23, 1910 |
| 1,043,107 | Howe | Nov. 5, 1912 |
| 1,732,670 | Wilmore | Oct. 22, 1929 |
| 1,806,903 | Ide | May 26, 1931 |
| 1,882,514 | Martens | Oct. 11, 1932 |
| 2,588,842 | Hutt | Mar. 11, 1952 |
| 2,626,552 | Oehler | Jan. 27, 1953 |
| 2,673,093 | Silver | Mar. 23, 1954 |
| 2,717,136 | Greeson | Sept. 6, 1955 |